United States Patent
Milani et al.

(10) Patent No.: US 11,884,337 B2
(45) Date of Patent: Jan. 30, 2024

(54) ACTIVE ROCKER AERO PANEL INTEGRATED INTO AUTOMATED RUNNING BOARD

(71) Applicant: Magna Exteriors Inc., Concord (CA)

(72) Inventors: Adolfo E. Milani, Commerce, MI (US); James W. Shelswell, Barrie (CA); Sorin O. Pantea, Woodbridge (CA)

(73) Assignee: Magna Exteriors Inc., Aurora (CA)

( * ) Notice: Subject to any disclaimer, the term of this patent is extended or adjusted under 35 U.S.C. 154(b) by 151 days.

(21) Appl. No.: 17/058,900

(22) PCT Filed: Jun. 3, 2019

(86) PCT No.: PCT/US2019/035210
§ 371 (c)(1),
(2) Date: Nov. 25, 2020

(87) PCT Pub. No.: WO2019/232531
PCT Pub. Date: Dec. 5, 2019

(65) Prior Publication Data
US 2021/0221449 A1    Jul. 22, 2021

Related U.S. Application Data

(60) Provisional application No. 62/679,349, filed on Jun. 1, 2018.

(51) Int. Cl.
*B60R 3/02* (2006.01)
*B62D 35/00* (2006.01)
*B60R 3/00* (2006.01)

(52) U.S. Cl.
CPC ............ *B62D 35/008* (2013.01); *B60R 3/002* (2013.01); *B60R 3/02* (2013.01)

(58) Field of Classification Search
CPC .......... B60R 3/02; B60R 3/002; B62D 35/008
See application file for complete search history.

(56) References Cited

U.S. PATENT DOCUMENTS 9,975,490 B1    5/2018 Ozog et al.
10,081,302 B1 *  9/2018 Frederick ................ B60R 3/002
(Continued)

FOREIGN PATENT DOCUMENTS

JP    2000190781 A    7/2000

OTHER PUBLICATIONS

International Search Report for Application No. PCT/US2019/035210 dated Nov. 18, 2019.

*Primary Examiner* — Bryan A Evans
(74) *Attorney, Agent, or Firm* — Warn Partners, P.C.

(57) ABSTRACT

An active rocker aerodynamic shield integrated into an automated running board for a motor vehicle. By using the existing automated running board linkages as a mounting location for the panels, the addition of a dedicated motor, linkage/pivot, and vehicle attachment scheme is no longer need for the aero benefit since components can be shared. The use of the moving linkages (Inner link, outer link, & lower mount) as attachment points for a panel(s) that is used to limit the flow of air to the underbody of a vehicle. When the miming board is in its stowed position. The panel is also stowed out of the line of sight and airflow. When the benefit of the aero panel is desired, the running board moves to the deployed position, orienting the aero panel in a position to reduce the amount of airflow under the vehicle.

15 Claims, 13 Drawing Sheets

(56) References Cited

U.S. PATENT DOCUMENTS

2016/0264193 A1\* 9/2016 Lee .................... B62D 35/008
2018/0134221 A1 5/2018 Burton \* cited by examiner

ACTIVE ROCKER AERO PANEL INTEGRATED INTO AUTOMATED RUNNING BOARD

CROSS-REFERENCE TO RELATED APPLICATIONS

This application is a National Stage of PCT International Application No. PCT/US2019/035210, filed Jun. 3, 2019, which claims the benefit of U.S. Provisional Patent Application No. 62/679,349, filed Jun. 1, 2018. The disclosures of the above applications are incorporated herein by reference.

FIELD OF THE INVENTION

The present invention relates to an active rocker aerodynamic shield incorporated into an automated running board.

BACKGROUND OF THE INVENTION

Large vehicles, such as sport utility vehicles (SUVs) and pick-up trucks, have a difficult time meeting industry and regulatory requirements, such as Corporate Average Fuel Economy (CAFE) requirements, more so with the added weight of a running board, such as an automated running board. Running boards are desirable on higher vehicles as a step. Aerodynamic panels are also desirable with vehicles having higher ground clearances to improve aerodynamics due to air flow under the vehicle. Adding effective panels below the rocker panel of the vehicle to limit the air flow, however, is generally not possible due to ground clearance requirements at lower vehicle speeds or at other predetermined conditions.

Attempts have been made to provide automated running boards assemblies. Attempts have also been made to provide automated side panel assemblies. One problem with known systems is they both are generally positioned in the limited package or space of the rocker panel area. Mounting both assemblies, with each having its own parts and complexities, would increase complexity and weight, or create interference between components or otherwise would not be effectively feasible.

A known deployable aerodynamic side panel system is described and depicted in U.S. Patent Publication No. US 2017/0137075 A1, which is incorporated herein in its entirety. This system addresses the issue of ground clearance by having the panel swing up and out of the ground plane at lower speeds. As a stand alone system, this concept makes the packaging of side steps more difficult and requires the use of a motor, linkages/pivots, and vehicle attachment dedicated specifically to make this system work.

Therefore, there remains a need in the art for a design that incorporates an automated running board and active aerodynamic shield to reduce the wind resistance on the underside of the vehicle, by limiting air flow from the side of the vehicle, with the intent of at least partially reducing the impact the weight that the running boards has toward meeting CAFE requirements.

SUMMARY OF THE INVENTION

The present invention provides an active rocker aerodynamic shield incorporated into an automated running board, said aerodynamic shield comprising at least one aerodynamic panel. The present invention uses automated running board linkages as a mounting location for the aerodynamic shield (or "aero panel"), therefore, the addition of a dedicated motor, linkage/pivot, and vehicle attachment scheme is not needed for the aero benefit. These can be shared with the existing components already being used by the automated running board (or "ARB"). When the running board is in its stowed position, the aerodynamic shield is also stowed, generally, out of the line of sight and airflow. When the benefit of the aerodynamic shield is desired, the running board moves to the deployed position, orienting the aerodynamic shield in a position to reduce the amount of airflow under the vehicle.

The ability of the aerodynamic shield to tuck away under the vehicle when not needed provides the needed ground clearance for the vehicle under predetermined conditions, e.g., at lower speeds, e.g., about 30 Mph. At other predetermined conditions, e.g., higher speeds, e.g., greater than at least about 30 Mph, when the aerodynamic benefits are needed more, the shield can be deployed to reduce air resistance under the vehicle, resulting in lower fuel consumption. The ability to use the shared mechanisms, motor, and attachment, make this a simpler and more cost effective solution.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 32-34B depict said automated running board in the deployed position;

FIGS. 41-43B depict said automated running board in the deployed position;

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, there is depicted a deployable system including an aerodynamic shield incorporated with an automated running board. The aerodynamic shield includes at least one panel.

Referring to FIGS. 1-9, there is depicted an assembly shown generally at 10 including an aerodynamic shield shown generally at 12 integrated into an automated running board shown generally at 14. The aerodynamic shield 12 includes at least one panel 16. The assembly 10 provides a mounting location to the vehicle with existing linkages. Preferably, at least two mounting portions 18a,18b or brackets are provided on links 24 and 26 to connect the assembly 10 to the vehicle 2, e.g., adjacent to the rocker panel to tuck up under the rocker sill when the assembly 10 is in the stowed position.

The automated running board 14 includes at least one step 20 board and at least one linkage assembly coupled to a motor 22. Preferably, the linkage assembly includes at least an idler link 24, drive link 26 operably connected to the motor 22, and a drive arm 28 operably connected to the idler link 24 and drive link 26. Rotation of the drive arm 28 causes the idler link 24 to extend. As the drive link 26 and idler link 24 extend, the step board 20 and aerodynamic shield 16 are moved to the deployed position (FIGS. 1-4b). As the links 24 and 26 retract, the step 20 and shield 16 are drawn upward to the stowed position underneath the vehicle (FIGS. 5-8).

The idler link 24 and drive link 26 each preferably include a plurality of links depending on the application, e.g., first link with mounting portions 18a and 18b, respectively, second links 30a and 30b, and third links 32a and 32b.

Figure 1:
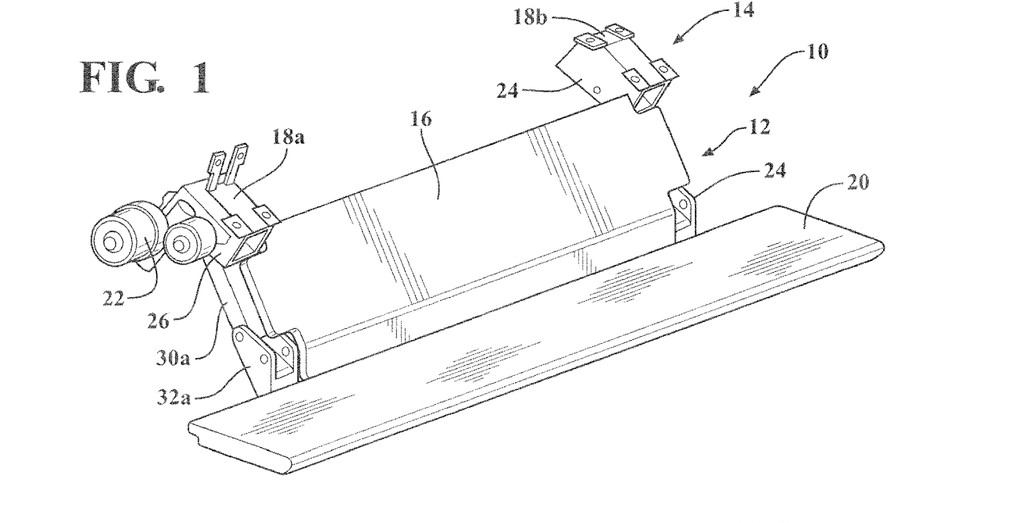
FIG. 1 is a perspective view of single piece aerodynamic shield coupled to the outboard side of links of an automated running board, depicted in a deployed position, in accordance with the present invention.
Figure 2:
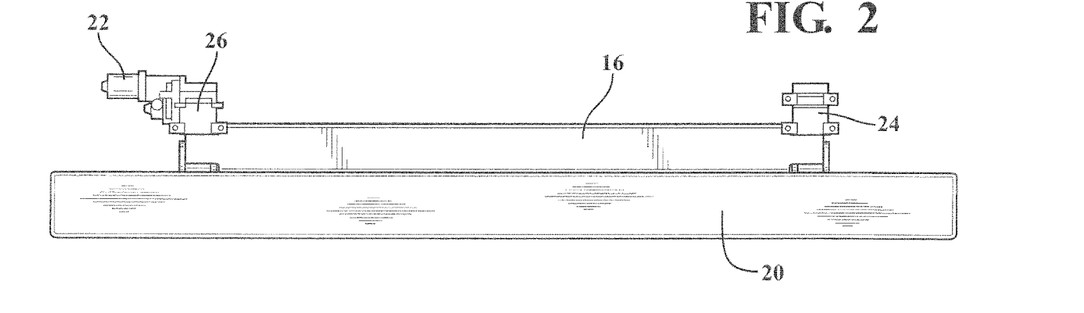
FIG. 2 is a top plan view of FIG. 1.
Figure 3:
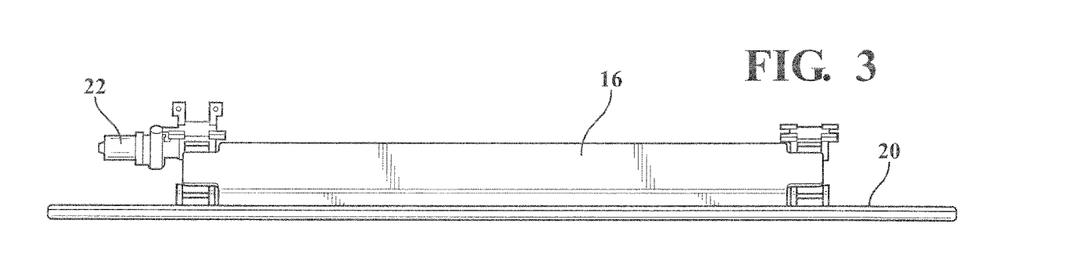
FIG. 3 is a front elevation of FIG. 1.
Figure 4A:
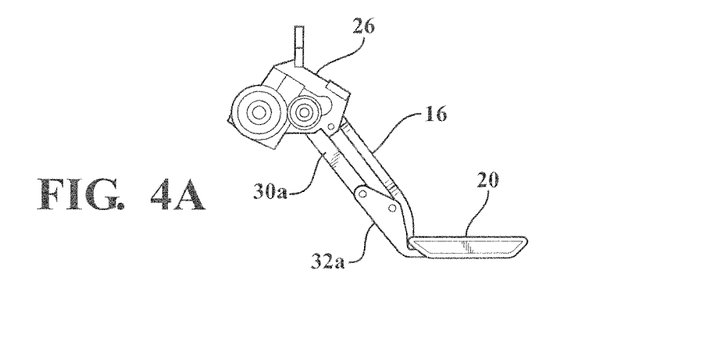
FIG. 4a is a side elevation view of FIG. 1.
Figure 4B:
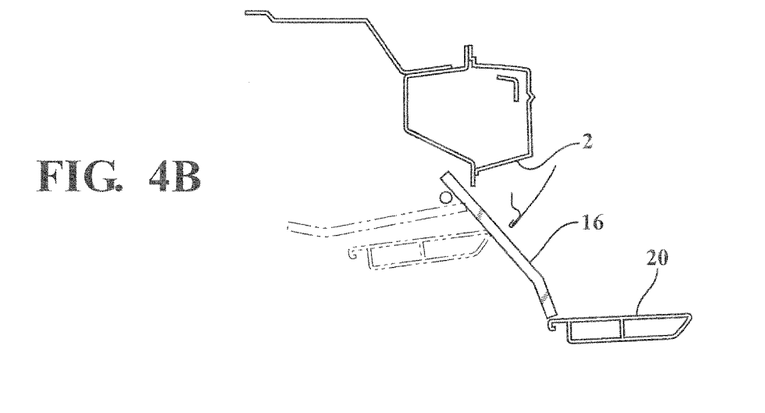
FIG. 4b is a cross sectional view of the assembly depicted in an exemplary environment of use.
Figure 5:
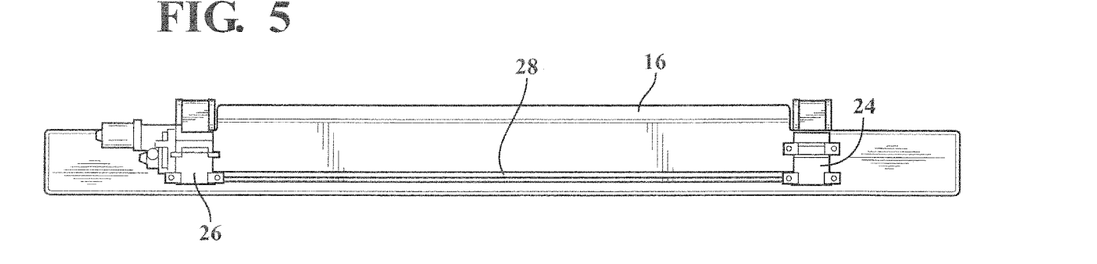
FIG. 5 is a top plan view of the assembly of FIG. 1 depicted in a stowed position, in accordance with the present invention.
Figure 6:
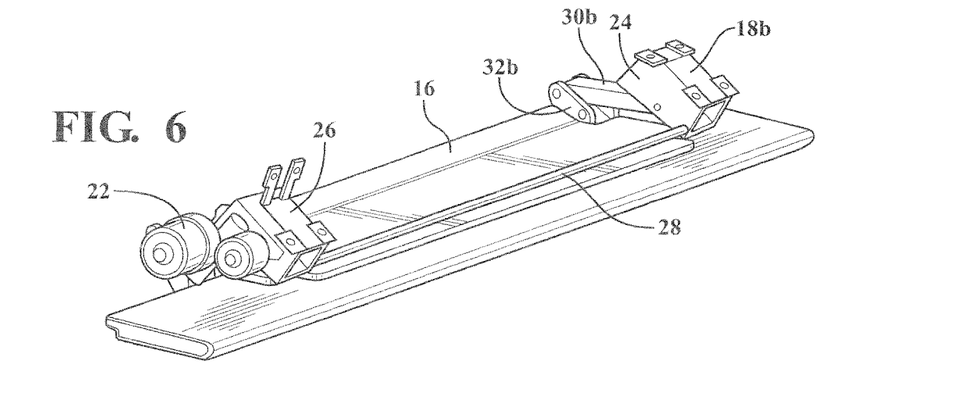
FIG. 6 is a perspective view of FIG. 5.
Figure 7:
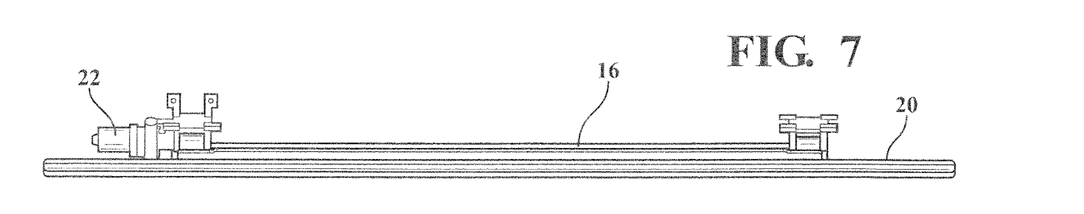
FIG. 7 is a front elevation of FIG. 5.
Figure 8:
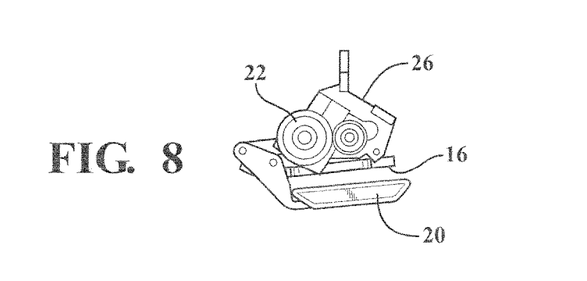
FIG. 8 is a side elevation of FIG. 5.
Figure 9:
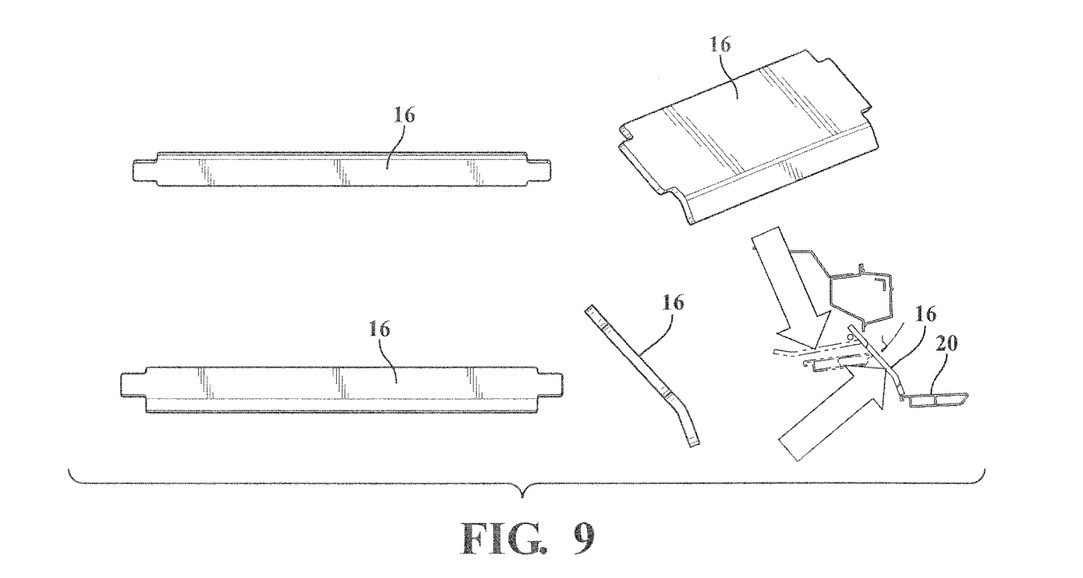
FIG. 9 depicts said aerodynamic shield and an environment of use.
Figure 10:
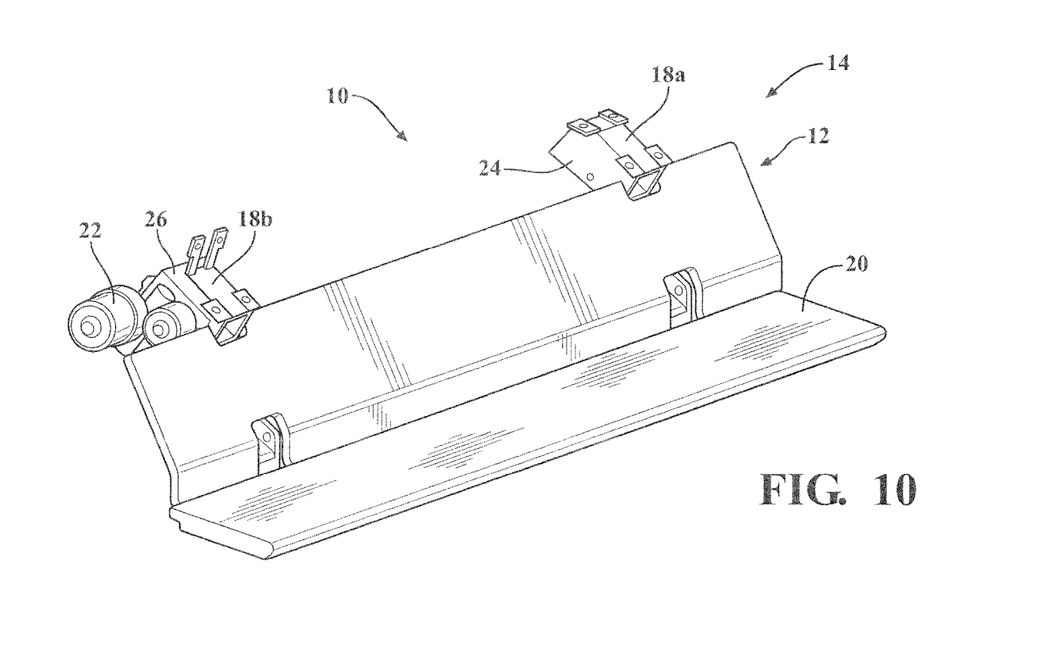
FIG. 10 is a perspective view of single piece aerodynamic shield coupled to the outboard side of links of an automated running board, depicted in a deployed position wherein the shield is the same length as a step board, in accordance with the present invention.
Figure 11:
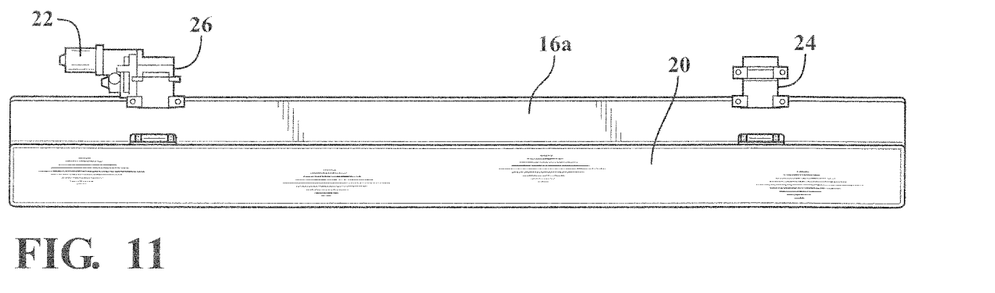
FIGS. 11-13 depict said automated running board in the deployed position.
Figure 12:
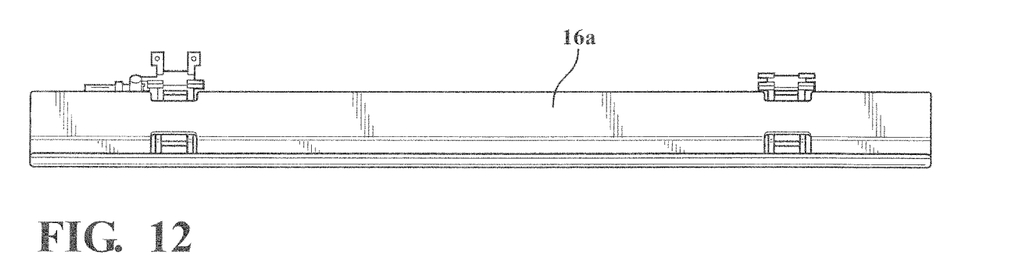
Figures 13A, 13B:
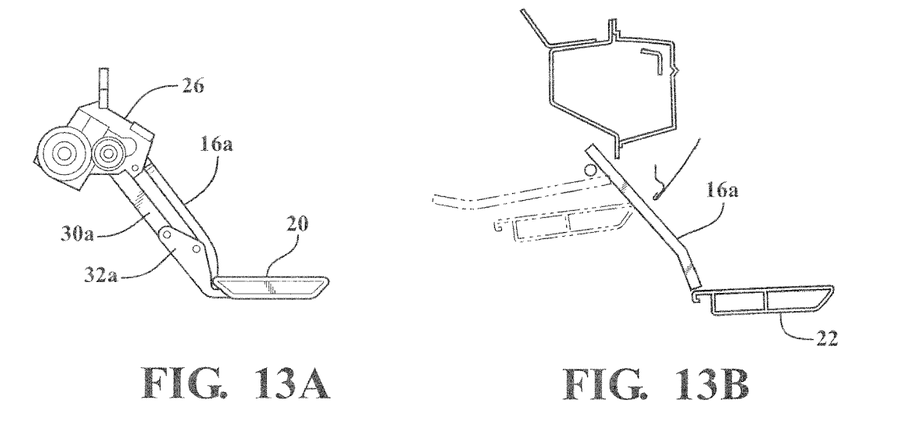
Figure 14:
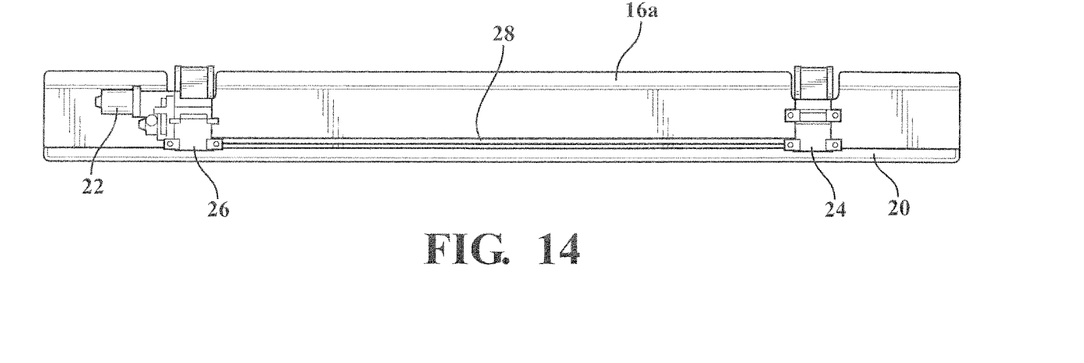
FIGS. 14-17 depict said automated running board in a stowed position.
Figure 15:
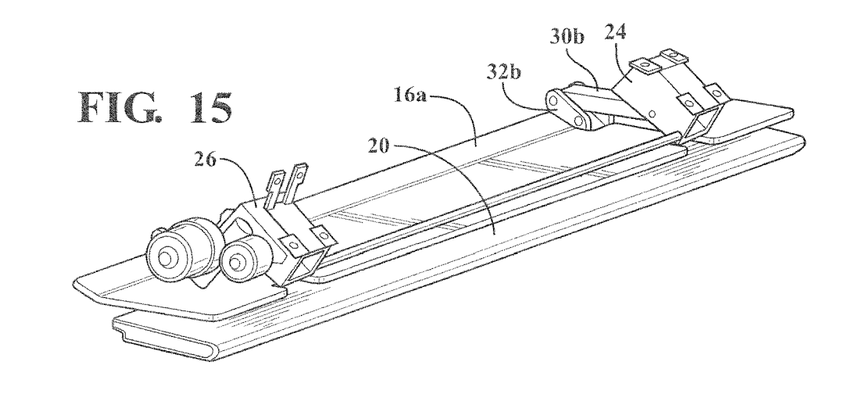
Figure 16:
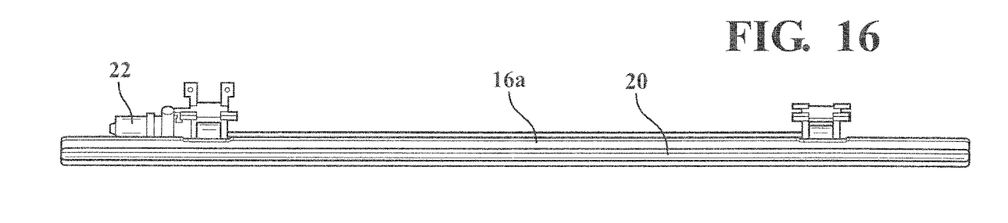
Figure 17:
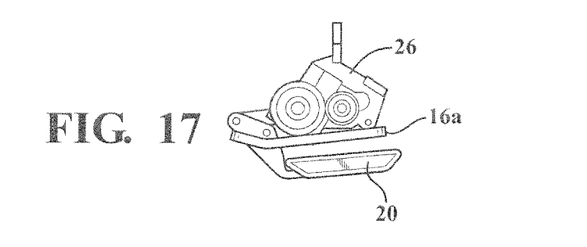
Figure 18:
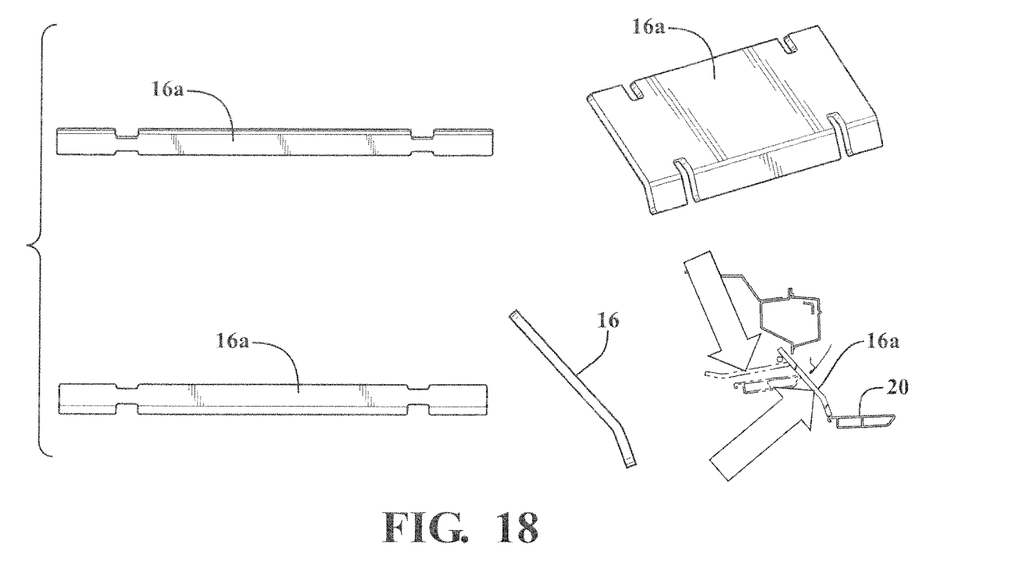
FIG. 18 depicts said aerodynamic shield of FIG. 10 and an environment of use.
Figure 19:
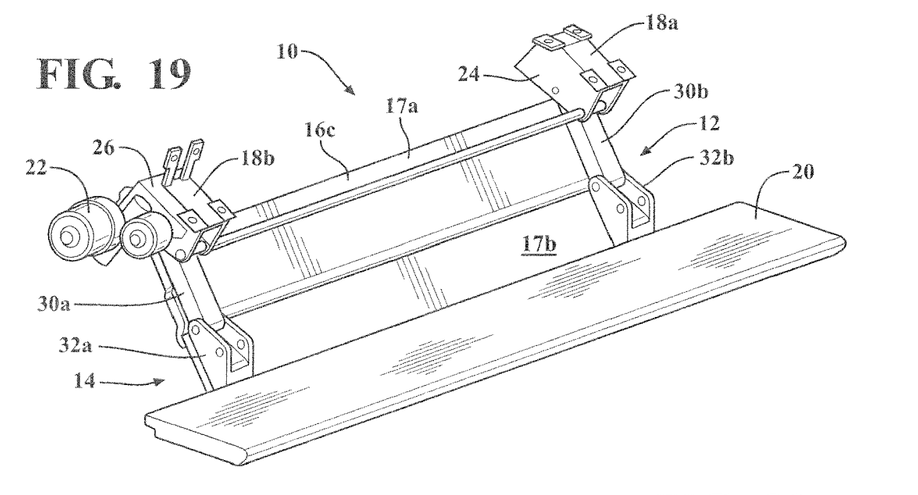
FIG. 19 is a perspective view of multi-piece aerodynamic shield coupled to inboard edge side of links of an automated running board, depicted in a deployed position, in accordance with the present invention.
Figure 20:
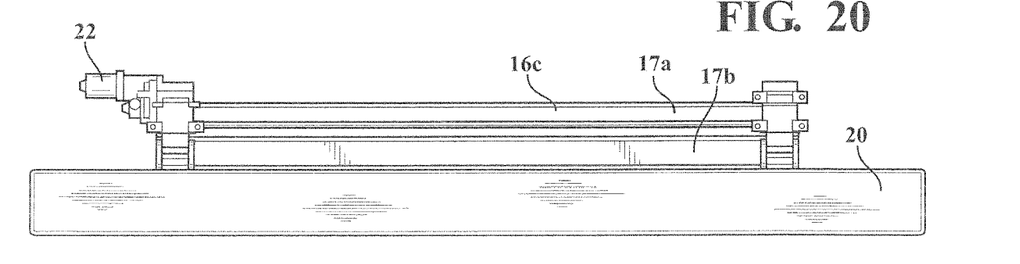
FIGS. 20-22, 27 and 28 depict said automated running board in the deployed position.
Figure 21:
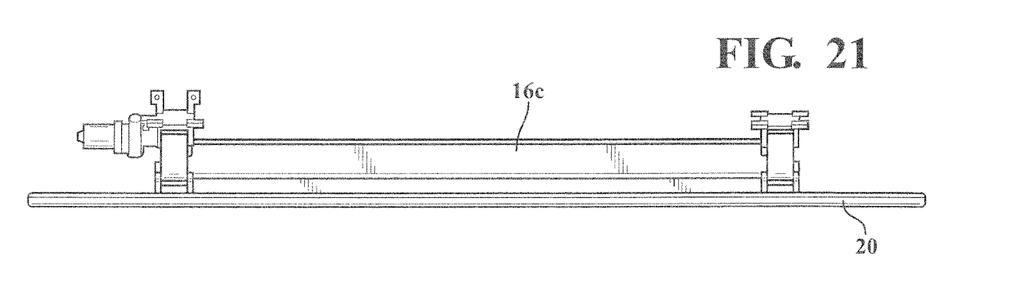
Figure 22A:
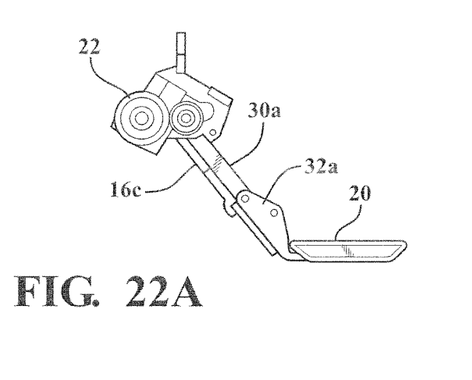
Figure 22B:
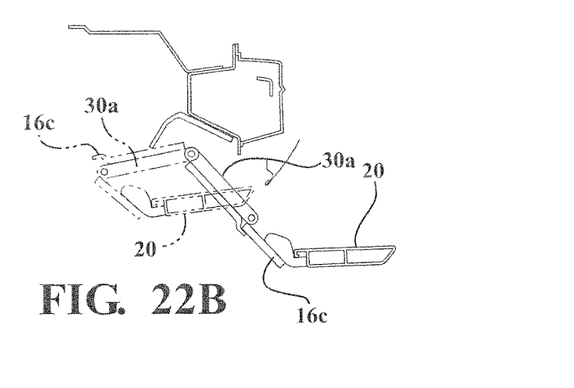
Figure 23:
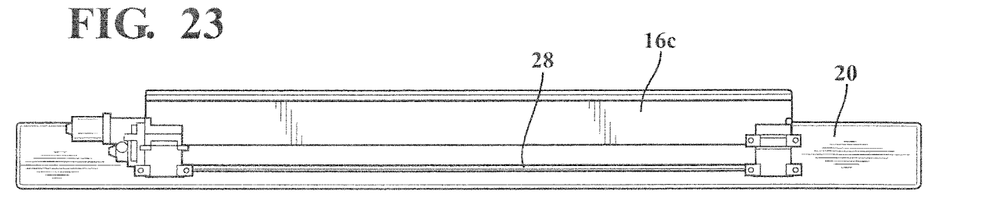
FIGS. 23-26 depict said automated running board in a stowed position.
Figure 24:
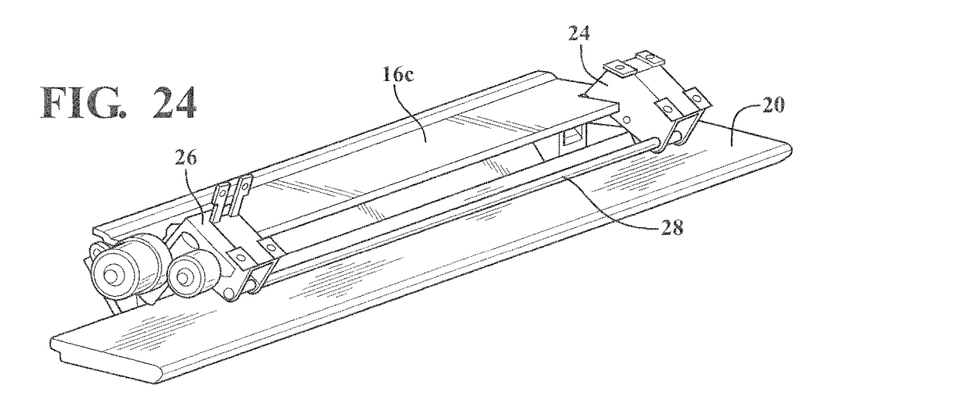
Figure 25:
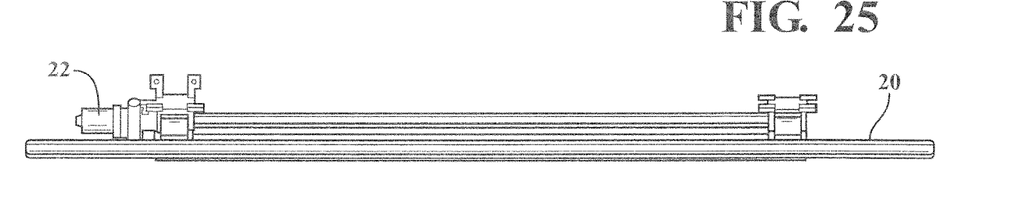
Figure 26:
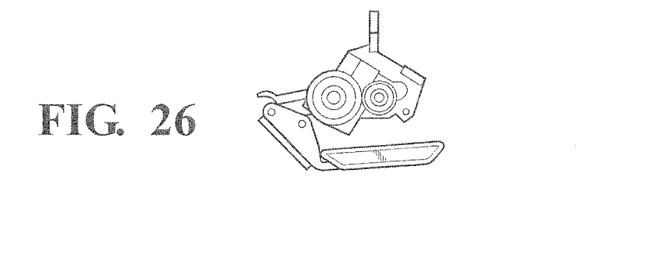
Figure 27:
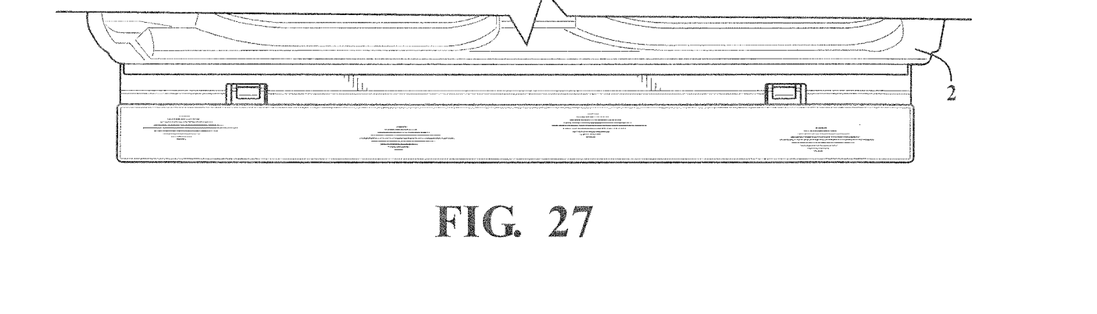
Figure 28:
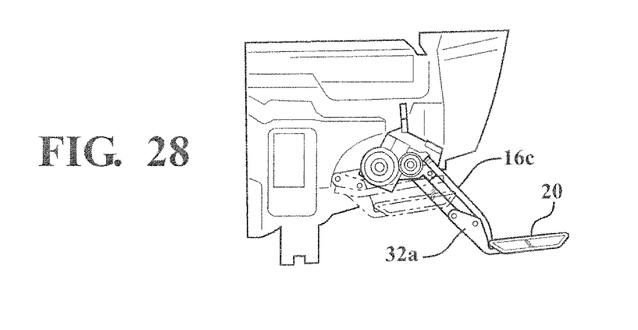
Figure 29:
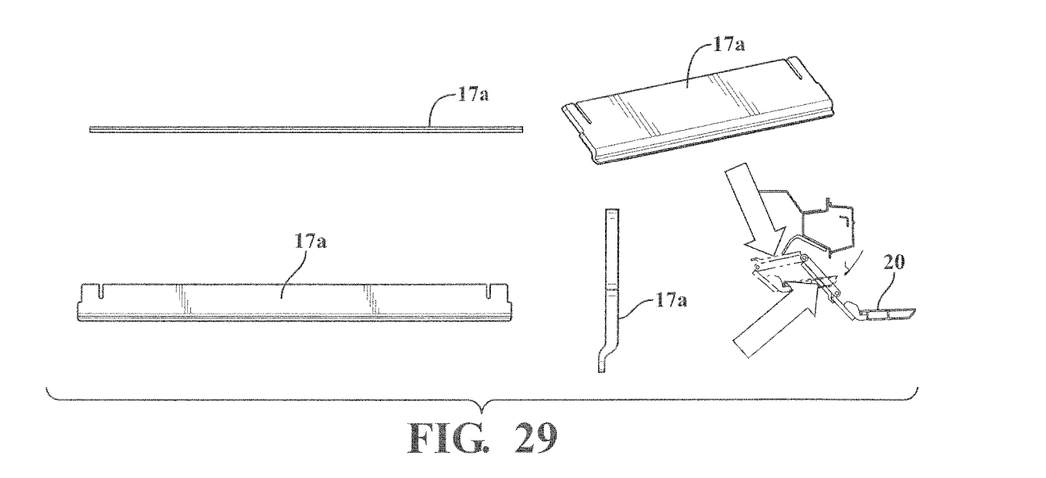
FIGS. 29-30 depict said aerodynamic shield of FIG. 19 and an environment of use.
Figure 30:
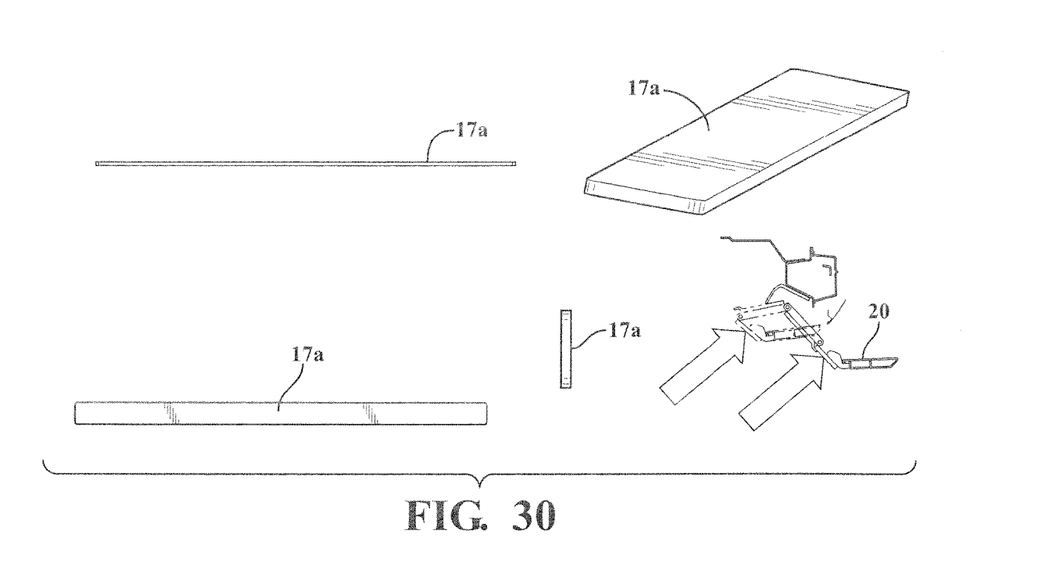
Figure 31:
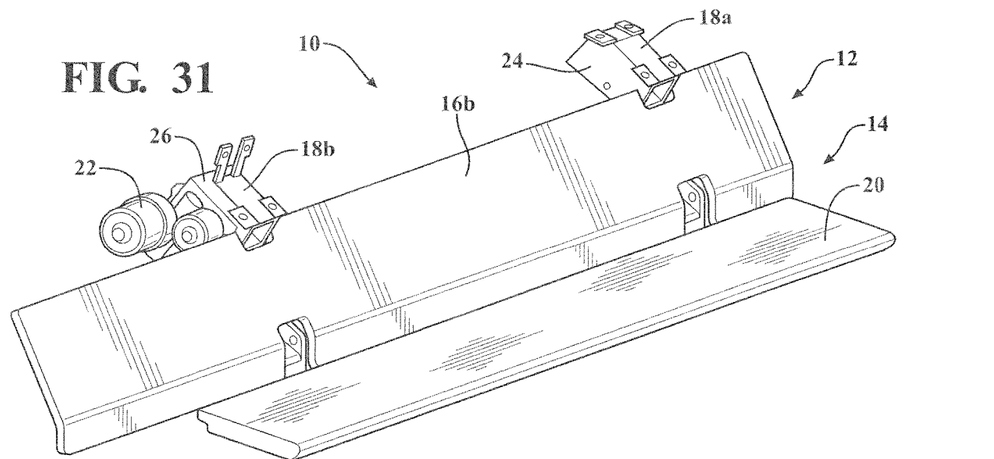
FIG. 31 is a perspective view of single piece aerodynamic shield coupled to the outboard side of links of an automated running board, depicted in a deployed position, wherein the shield is longer than a step board, in accordance with the present invention.
Figure 32:
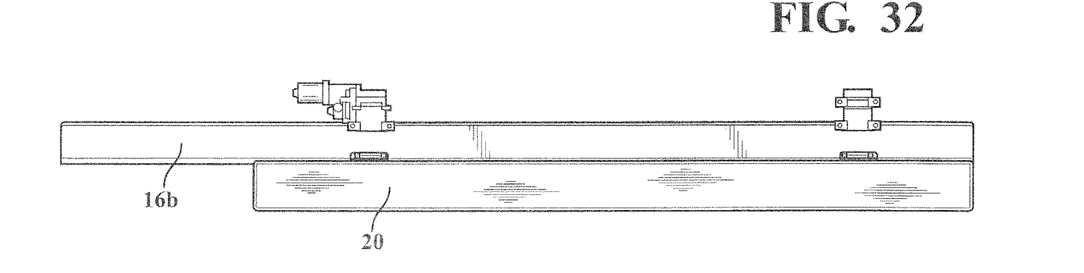
Figure 33:
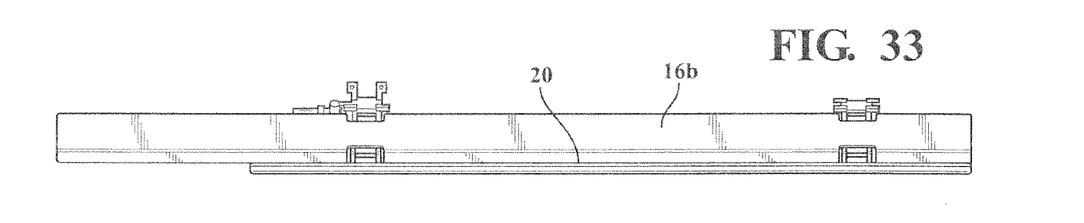
Figures 34A, 34B:
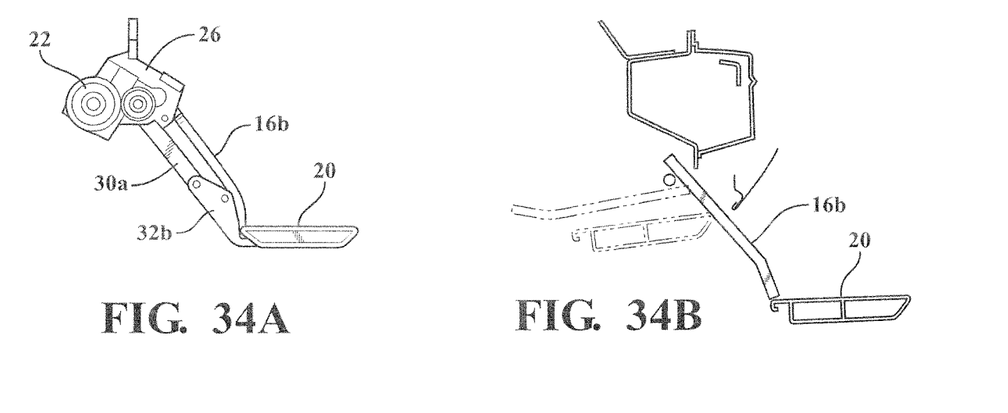
Figure 35:
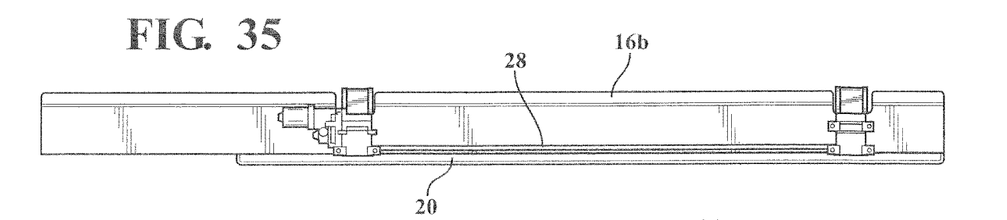
FIGS. 35-38 depict said automated running board in a stowed position.
Figure 36:
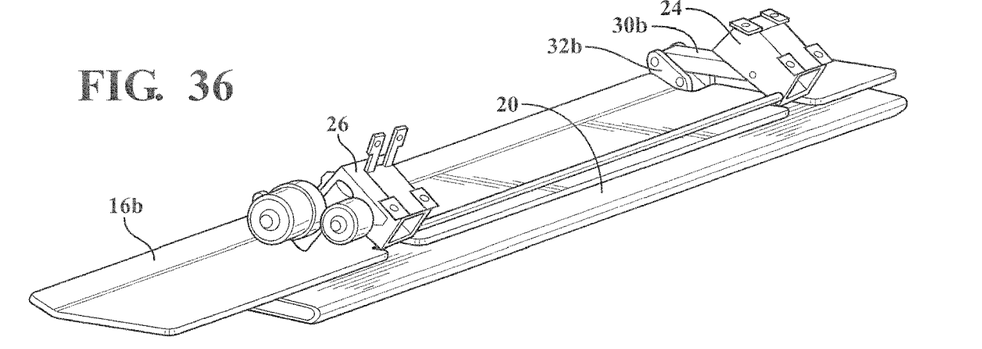
Figure 37:
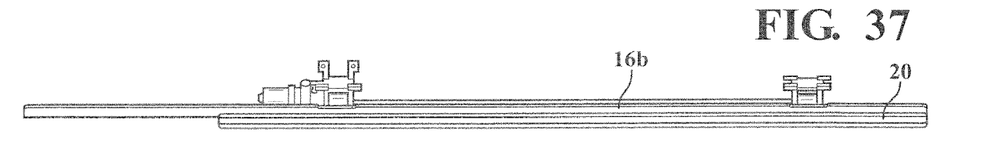
Figure 38:
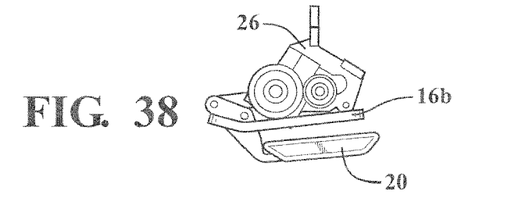
Figure 39:
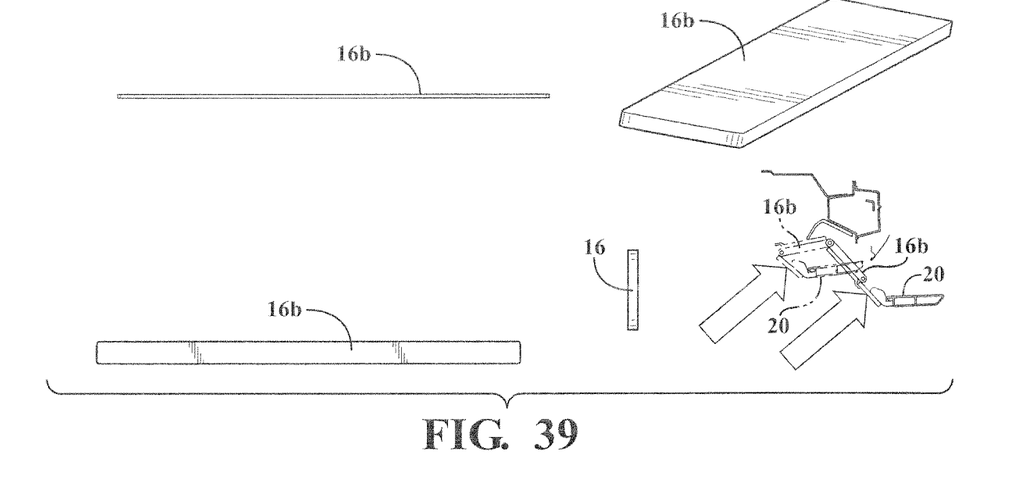
FIG. 39 depicts said aerodynamic shield of FIG. 31 and an environment of use.
Figure 40:
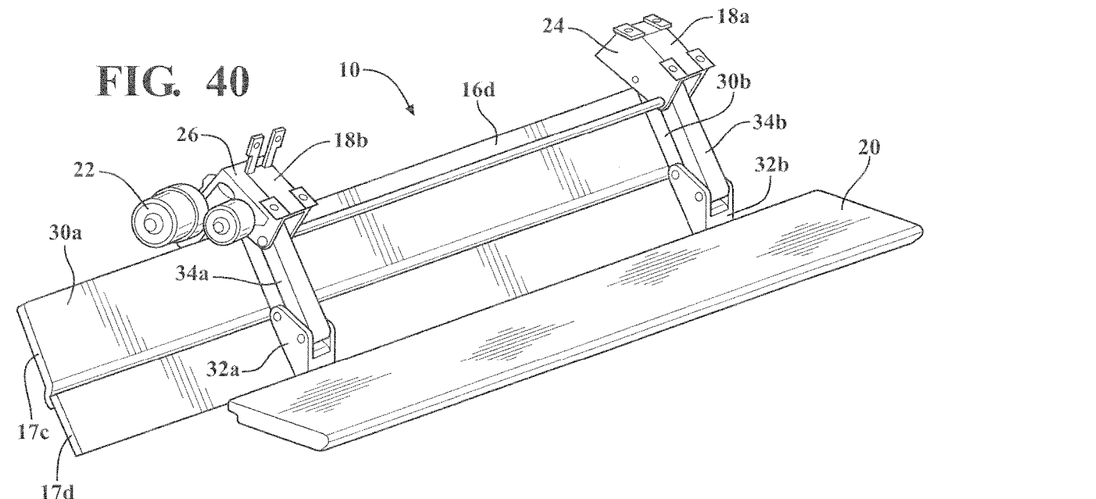
FIG. 40 is a perspective view of multi-piece aerodynamic shield coupled to inboard edge side of links of an automated running board, depicted in a deployed position, wherein the shield is longer than a step board, in accordance with the present invention.
Figure 41:
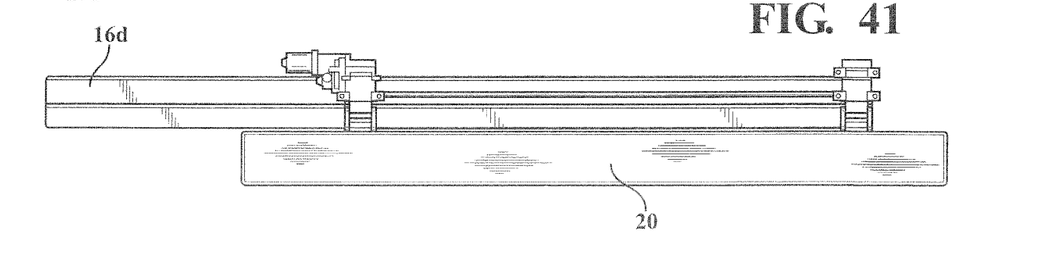
Figure 42:
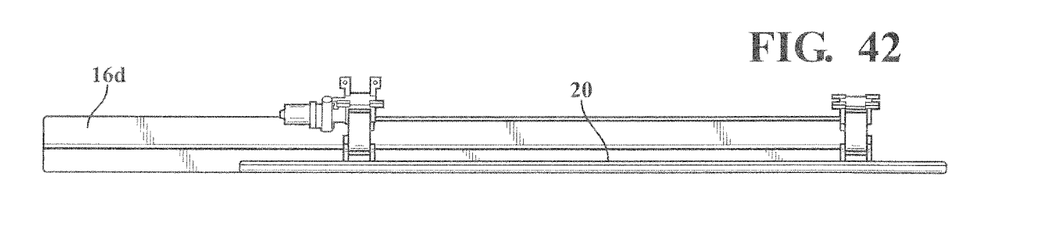
Figure 43A:
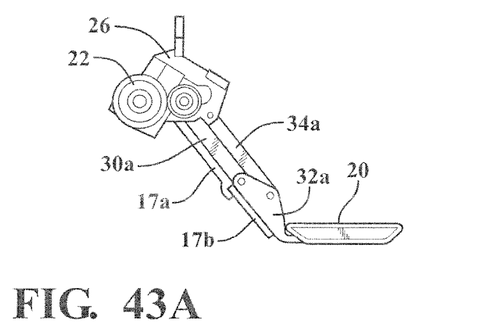
Figure 43B:
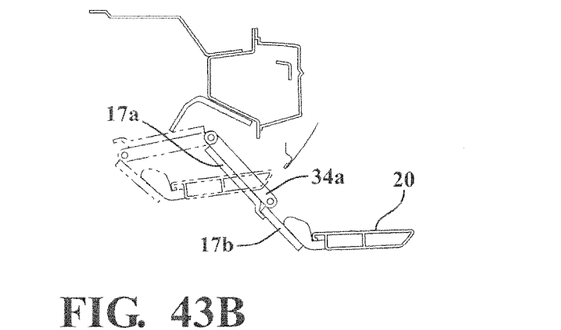
Figure 44:
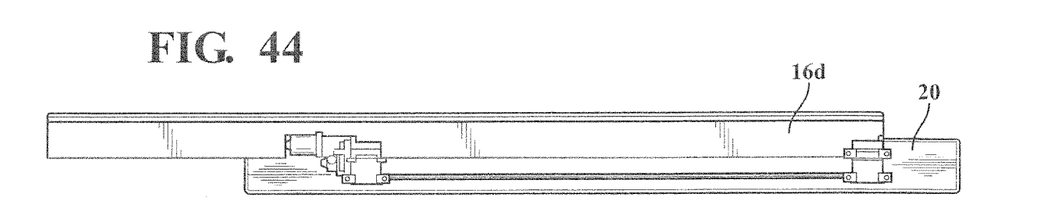
FIGS. 44-47 depict said automated running board in a stowed position.
Figure 45:
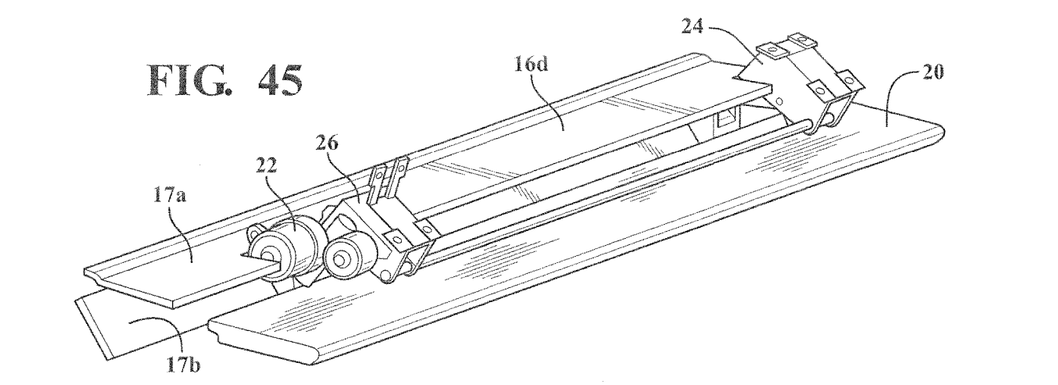
Figure 46:
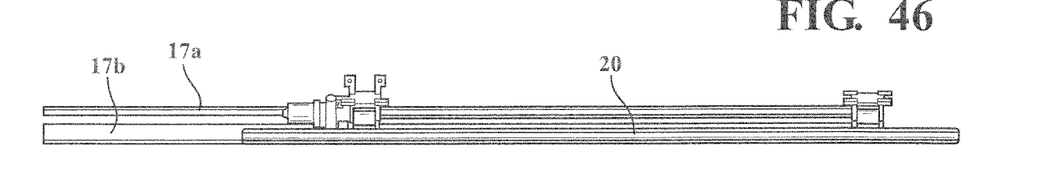
Figure 47:
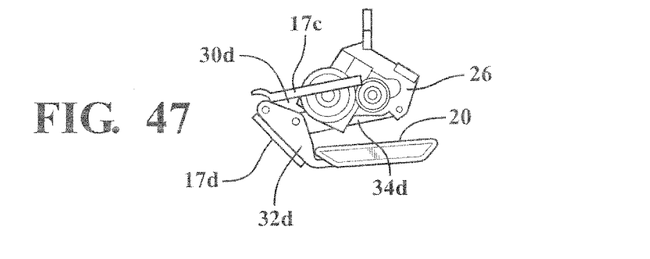
Figure 48:
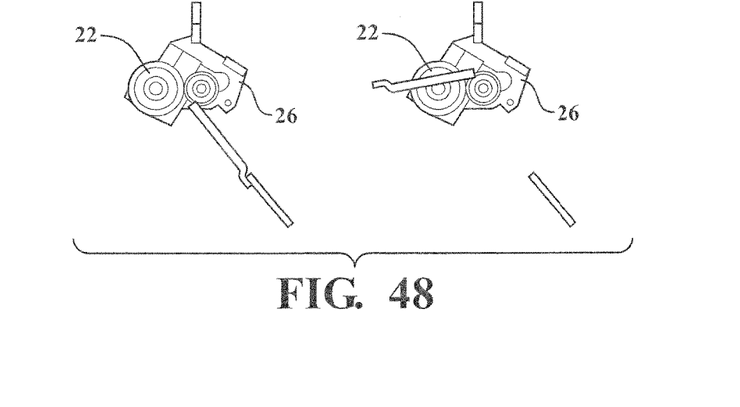
FIG. 48 depict said automated running board in a deployed position and a stowed position.
Figure 49A:
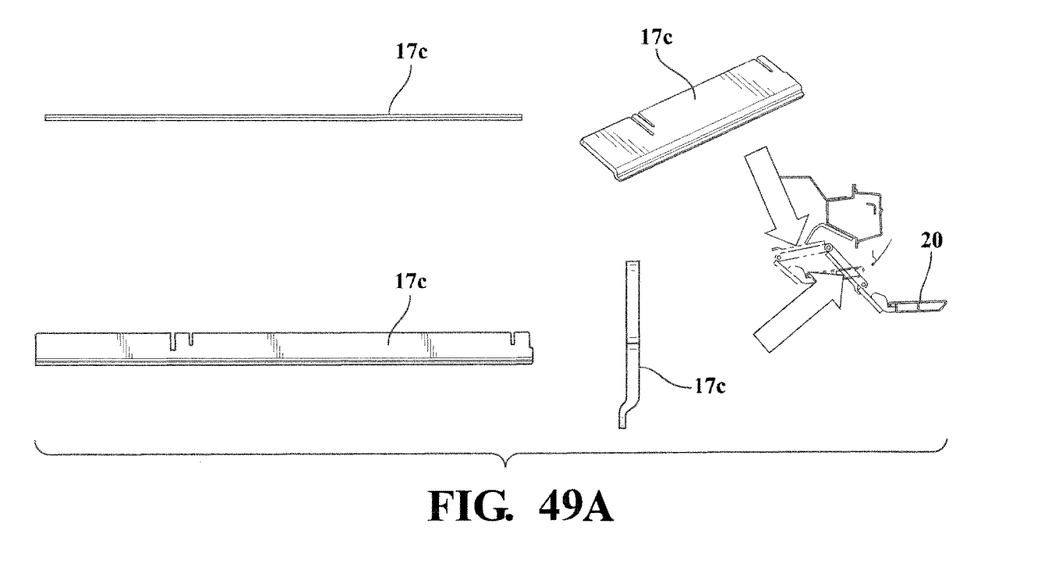
FIG. 49A depicts a first panel of said aerodynamic shield of FIG. 40 and an environment of use.
Figure 49B:
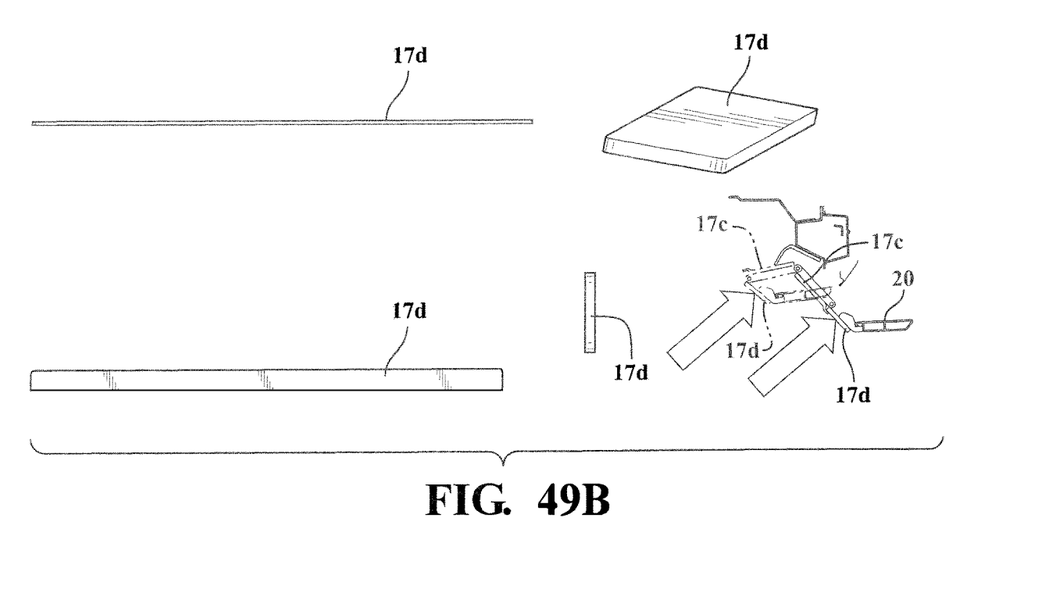
FIG. 49B depicts a second panel of said aerodynamic shield of FIG. 40 and an environment of use.

Preferably, the second links 30a,30b are inner links. Preferably, the third links 32a,32b are lower mounts. Preferably, fourth links (34a,34b in FIG. 39, etc) are outer links and are used in the assembly 10 (of FIGS. 1-45).

The aerodynamic shield 12 is a single piece (e.g., single panel 16) aerodynamic shield operably connected to the outboard side of the idler and drive links 24 and 26.

Optionally, a seal closes any gaps between panel 16 and step board 20 and/or panel 16 and vehicle 2.

Referring now to FIGS. 10-18, there is depicted the assembly 10 including the aerodynamic shield 12 (including at least one panel 16) integrated into the automated running board 14, wherein the aerodynamic shield 12 is a single piece (e.g., single panel) aerodynamic shield operably connected to the outboard side of the idler and drive links 24 and 26, however, the at least one panel 16a of the aerodynamic shield 12 is longer. Thus, FIGS. 10-18 are identical to FIGS. 1-9 except that the at least one panel 16a has a greater length, preferably, to substantially the same length as the step board 20. Optionally, a seal closes any gaps between panel 16a and step board 20 and/or panel 16a and vehicle 2.

Referring now to FIGS. 31-38, there is depicted the assembly 10 including the aerodynamic shield 12 (including at least one panel 16) integrated into the automated running board 14, wherein the aerodynamic shield 12 is a single piece (e.g., single panel) aerodynamic shield operably connected to the outboard side of the idler and drive links 24 and 26, however, the at least one panel 16b of the aerodynamic shield 12 is longer. Thus, FIGS. 31-38 are identical to FIGS. 1-9 (and FIGS. 10-18) except that the at least one panel 16b has a greater length, preferably, to be longer than the step board 20 length, most preferably, substantially the length between the wheels of the vehicle. Optionally, a seal closes any gaps between panel 16b and step board 20 and/or panel 16b and vehicle 2.

Referring now to FIGS. 19-30, there is depicted the assembly 10 including the aerodynamic shield 12 (including at least one panel 16) integrated into the automated running board 14, wherein the aerodynamic shield 12 is a multiple piece (e.g., at least two panel) aerodynamic shield operably connected to the automated running board 14, e.g., to the inboard side of the second and/or third links 30a,30b and/or 32a,32b. The aerodynamic shield 16d is operably connected to the automated running board 14, preferably, to the inboard edge of the links of the automated running board. The shield 16d has at least one first portion 17a (e.g., upper section) operably coupled to at least one second portion 17b (e.g., lower section). Thus, FIGS. 19-30 are substantially identical to FIGS. 1-9 except that the at least one panel 16d is multiple pieces (e.g., first and second portions 17a and 17b) and is operably connected to the inboard side of the links. Optionally, a seal closes any gaps between panels 17a,17b and/or the step board 20 and/or panel 16d and vehicle 2.

Referring now to FIGS. 39-49, there is depicted the assembly 10 including the aerodynamic shield 12 (including at least one panel 16) integrated into the automated running board 14, wherein the aerodynamic shield 12 has at least one panel 16d, preferably, a multiple piece (e.g., at least two panels 17c and 17d) aerodynamic shield operably connected to the automated running board 14, e.g., to the inboard side of the second and/or third links 30a,30b and/or 32a,32b, however, the at least two panels 17c and 17d of the aerodynamic shield 12 are longer. Thus, several features of FIGS. 39-49 are substantially identical to FIGS. 19-30 (and FIGS. 1-9) except that the first panel 17c and second panel 17*d* have a greater length, preferably, to longitudinally extend past at least one end of the step board 20 (e.g., forward end or rearward end, preferably, past the forward end). Alternatively, the first and second panels 17*c* and 17*d* extend substantially the length of the step board 20. A pair of fourth links 34*a*,34*b* is also provide. These fourth links are also preferably substantially identically incorporated on each the the assemblies 10 of FIGS. 1-38. Optionally, a seal closes any gaps between panels 17*c*,17*d* and/or the step board 20 and/or panel 16*d* and vehicle 2.

Referring to the Figures generally, it is understood that any other shape, geometry, size and dimensions suitable for a running board 20 and aerodynamic shield 14 (e.g., 16, 16*a*,16*b*,16*c*,16*d*) connected to the assembly 10 is contemplated depending on the application without departure from the scope of the present invention.

Optionally, the aerodynamic panel has recesses, notches, gaps or openings to accommodate or otherwise make room for and prevent interference with any other components, e.g., links, motor, etc.

Referring to the Figures generally, by using the existing automated running board linkages as a mounting location for the panels, the addition of a dedicated motor, linkage/pivot, and vehicle attachment scheme is no longer need for the aero benefit. It can be shared with the existing components already being used by the automated running board.

The use of the moving linkages (Inner Link, Outer Link, & Lower Mount) as attachment points for a panel(s) that is used to limit the flow of air to the underbody of a vehicle. When the running board is in its stowed position. The panel is also stowed out of the line of sight and airflow. When the benefit of the aero panel is desired, the running board moves to the deployed position, orienting the aero panel in a position to reduce the amount of airflow under the vehicle.

The ability of the aero panel to tuck away under the floor of the vehicle when not needed, provides the needed ground clearance for the vehicle at lower speeds. At higher speeds, when the aero benefits are needed more, the panel can be deployed to reduce air resistance under the vehicle, resulting in lower fuel consumption. The ability to use the existing mechanisms, motor, and attachment, make this a simpler and more cost effective solution.

It is further understood that more than one running board and/or more than one aerodynamic shield can be used in each assembly.

The aerodynamic shield has at least one aerodynamic panel. The at least one aerodynamic panel is attached in a predetermined location. The aerodynamic panel is attached generally between the drive and idler links. Alternatively, the aerodynamic panel generally extends substantially the entire length of the step. Alternatively, the aerodynamic panel is longer than the step. Typically, the aerodynamic panel is attached between the drive and idler links and is mounted to the outboard side of these links. Alternatively, the aerodynamic panel mounts to the inboard edge of the links. Alternatively, the aerodynamic shield includes at least two aerodynamic panels that mount to the inboard edge of the links. Any suitable aerodynamic length, pieces, and attachment location(s) depending on the application is/are contemplated without departure from the scope of the present invention.

The present invention incorporates predetermined hinge kinematics suitable for deploying the board and aerodynamic shield.

The aerodynamic shield is a predetermined suitable material to meet predetermined parameters. Generally, the aerodynamic shield is an extruded part, typically, an extruded part that is powder coated aluminum, or extruded plastic. The aerodynamic shield material can be a range of materials from thermoplastic olefin (TPO)/Santoprene molding through to a type of bellows. A molded piece could be very rigid. A bellows could be a softer material, such as a very soft rubber or fabric like a sail cloth or tonneau cover of a pick-up truck, etc. The softer the material, the more opportunity for the material to move or ripple in the airstream. Rigid or semi-rigid reinforcements or framing is contemplated without departure from the scope of the present invention.

Generally, the aerodynamic shield has a small opening (e.g., about 1 inch, etc between the panel and the step), and, a small opening (e.g., about 1 inch, etc gap between the step board and vehicle body) between the panel and the sill of the vehicle (e.g., rocker (sill) position). Optionally, to further address aerodynamics, a seal (e.g., rubber seal, thermoplastic elastomers (TPE), ethylene propylene diene monomer (EPDM) rubber) is provided to seal out air flow through the opening(s). The seal is provided on the top and/or bottom of the aerodynamic seal, on the step, or on the vehicle, e.g., the door.

The present invention in a deployed position is adaptable to provide a predetermined deployed dimension from the vehicle body depending on the application. By way of non-limiting example, a width dimension from the body to the outward edge of the stepping surface of, generally, at least 150 mm, typically, at least 170 mm, preferably, at least about 190 mm, most preferably, about 195 mm. It is understood that any other dimension is contemplated depending on the application without departure from the scope of the present invention.

The present invention in a deployed position is adaptable to provide a predetermined deployed dimension from the ground surface depending on the application. By way of non-limiting example, a ground clearance dimension from the ground to the underside of the stepping surface of, generally, at least 200 mm, typically, at least 250 mm, preferably, at least about 300 mm, most preferably, about 310 mm. Preferably, the deployed step height is at least about 300 mm. It is understood that any other dimension is contemplated depending on the application without departure from the scope of the present invention.

The present invention is adaptable to any vehicle, in particular, to any vehicle having higher ground clearances (e.g., at least about 200 mm, at least about 300 mm, at least about 350 mm, at least about 400 mm, etc) without departure from the scope of the present invention.

The assembly is adaptable and suitable to withstand predetermined forces acting on the board during the deployment and stow functions.

An exemplary aerodynamic force analysis is set forth in Table 1. The table includes pressure and forces acting on the shields.

TABLE 1

| vehicle speed (mph) | vehicle speed (m/s) | panel and wind direction angle (degree) | drag coefficient Cd | air dentity rho at 20 C (kg/m^3) | Projected area (m^2) | drag pressue (Pa) p = Cd * rho * v^2/2 | Drag force (N) Fd = Cd * rho * A * v^2/2 |
|---|---|---|---|---|---|---|---|
| 20 | 8.9408 | 0 | 1.1 | 1.20 | 0.00 | 52.76 | 0.00 |
| 20 | 8.9408 | 30 | 1.1 | 1.20 | 0.16 | 52.76 | 8.58 |
| 20 | 8.9408 | 60 | 1.1 | 1.20 | 0.28 | 52.76 | 14.86 |
| 20 | 8.9408 | 90 | 1.1 | 1.20 | 0.33 | 52.76 | 17.16 |
| 35 | 15.6464 | 0 | 1.1 | 1.20 | 0.00 | 161.57 | 0.00 |
| 35 | 15.6464 | 30 | 1.1 | 1.20 | 0.16 | 161.57 | 26.27 |
| 35 | 15.6464 | 60 | 1.1 | 1.20 | 0.28 | 161.57 | 45.50 |
| 35 | 15.6464 | 90 | 1.1 | 1.20 | 0.33 | 161.57 | 52.54 |
| 50 | 22.352 | 0 | 1.1 | 1.20 | 0.00 | 329.74 | 0.00 |
| 50 | 22.352 | 30 | 1.1 | 1.20 | 0.16 | 329.74 | 53.61 |
| 50 | 22.352 | 60 | 1.1 | 1.20 | 0.28 | 329.74 | 92.86 |
| 50 | 22.352 | 90 | 1.1 | 1.20 | 0.33 | 329.74 | 107.23 |

In addition, an exemplary worst case is a 50 mph side wind is producing a force of about 107N on the shield. If the full extent of the vehicle air flow is unknown, the actual effect could be increased with a negative pressure on the backside of the shield; using a design factor of 2.0 assumes that the shield sees a load of 214N. Preferably, the present invention is effective for withstanding at least these pressures and forces acting on the aerodynamic shield, as set forth in this paragraph and Table 1.

Optionally, the forward end of the assembly incorporates predetermined profiling or reducing of the forward area size of the part to further reduce upwind high pressure, thereby reducing drag. Optionally, to reduce downwind low pressure zones created by wake recirculation of flow deformation, the assembly has predetermined profiling to limit flow separation. Optionally, the gap between the running board and vehicle body is reduced a predetermined amount or eliminated to further reduce drag. Optionally, the forward and rearward ends of the running board are profiled to reduce frontal area and wake, thereby reducing drag.

Optionally, a slush or mud guard or other feature is incorporated suitable to mitigate effects of slush or mud building up on the board during operation.

The present invention has at least one deployed position. Additional deployed positions depending on the application are contemplated without departure from the scope of the present invention. The board of the present invention moves generally downward to the deployed position. Alternatively, a horizontal swing linkage arrangement to swing the board outboard is contemplated depending on the application without departure from the scope of the present invention.

Object detection and suitable compatible actuator is contemplated without departure from the scope of the present invention.

Suitable electronics are contemplated to sense and communicate when a door is ajar (or switch is actuated) to deploy the step, and when the door is shut (or a switch is actuated) to retract the step to the stowed position.

Suitable electronics, sensors, communication or any other suitable device is contemplated for determining if predetermined conditions exist, e.g., yaw, vehicle speed, clearance height, etc to deploy or retract the step 20/shield 16 when the predetermined conditions exist.

Predetermined conditions include, but are not limited to, selected from vehicle speed, wind direction, e.g., average wind direction is unfavorably about 5° yaw, and any other predetermined condition depending on the application, etc. By way of example, the panel is stowed under vehicle and when the vehicle reaches a predetermined speed, e.g., about 30-40 mph, at least about 30 mph, etc, the assembly moves to the deployed position and stays down until the vehicle drops back down to below the predetermined speed or other predetermined conditions for continued deployment are no longer met.

At least one assembly is mounted per side of the vehicle. However, it is contemplated that more than one per side is mounted, each having the same or different lengths, without departure from the scope of the present invention. The assembly provides a step into the cab or sport utility vehicle front and/or rear cockpits. Optionally, at least one assembly is mounted to the vehicle for a bed step for a bed of a pick-up truck.

The aerodynamic shield is straight, curved or angled relative to the rocker sill of the vehicle depending on the application. By way of non-limiting example, the shield is angled outboard at the forward end or rearward end. By way of another non-limiting example, the shield is angled downward or has a greater height at the forward end or the rearward end. By way of non-limiting example, the shield is angled outboard at the upper end or lower end. Preferably, the shield is angled outboard with the lower end furthest from the vehicle (e.g., lower end adjacent the upper inward board edge). By way of non-limiting example is shield includes at least inboard curve or outboard curve along its length. Alternatively, the shield is substantially straight in the longitudinal and vertical directions.

The term outboard used herein generally refers to the direction away from the side of the vehicle. The term inboard used herein generally refers to the direction toward the vehicle.

While an exemplary automated running board is depicted, it is understood that any alternative automated running board, depending on the application, can be used and the active rocker aerodynamic shield of the present invention is integrated into the automated running board without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active rocker aerodynamic shield integrated into an automated running board for a vehicle, comprising:
    an automated running board including a plurality of links for movement of a step board under predetermined conditions between a stowed position and at least one deployed position;
    at least one panel forming said aerodynamic shield, said at least one panel operably connected to the automated running board to automatically deploy and retract with the step board for improved aerodynamics under predetermined conditions, wherein said at least one panel is the same length as the step board.

2. The active rocker aerodynamic shield integrated into an automated running board of claim 1, wherein there are at least two panels.

3. The active rocker aerodynamic shield integrated into an automated running board of claim 1, wherein there are at least two panels operably connected to an inboard side of said links.

4. The active rocker aerodynamic shield integrated into an automated running board of claim 1, wherein said at least one panel extends between said links.

5. The active rocker aerodynamic shield integrated into an automated running board of claim 1, wherein said at least one panel is operably connected to an outboard side of said links.

6. An active rocker aerodynamic shield integrated into an automated running board for a vehicle, comprising:
    an automated running board including a plurality of links for movement of a step board under predetermined conditions between a stowed position and at least one deployed position;
    at least one panel forming said aerodynamic shield, said at least one panel operably connected to the automated running board to automatically deploy and retract with the step board for improved aerodynamics under predetermined conditions, wherein said at least one panel is operably connected to an outboard side of said links and is longer than said step board.

7. An active rocker aerodynamic shield integrated into an automated running board for a vehicle, comprising:
    an automated running board including a plurality of links for movement of a step board under predetermined conditions between a stowed position and at least one deployed position;
    at least one panel forming said aerodynamic shield, said at least one panel operably connected to the automated running board to automatically deploy and retract with the step board for improved aerodynamics under predetermined conditions, wherein said at least one panel is operably connected to an outboard side of said links and extends past a forward edge of said step board.

8. The active rocker aerodynamic shield integrated into an automated running board of claim 1, wherein said at least one panel substantially extends the length between front and rear wheels of the vehicle.

9. The active rocker aerodynamic shield integrated into an automated running board of claim 1, wherein said assembly operably mounts adjacent to said rocker panel sill.

10. The active rocker aerodynamic shield integrated into an automated running board of claim 1, wherein the links comprise an idler linkage operably coupled to a drive arm, said drive arm operably coupled to a drive linkage that is operably coupled to a motor.

11. The active rocker aerodynamic shield integrated into an automated running board of claim 10, each idler linkage and linkage includes a mounting portion for attachment to the vehicle.

12. The active rocker aerodynamic shield integrated into an automated running board of claim 10, each idler linkage and linkage includes an inner link, an outer link and a lower mount, wherein the lower mount is operably connected to said step board.

13. An active rocker aerodynamic shield integrated into an automated running board for a vehicle, comprising:
    an automated running board including a plurality of links for movement of a step board under predetermined conditions between a stowed position and at least one deployed position;
    at least two panels forming said aerodynamic shield, said at least two panels operably connect to the automated running board to automatically deploy and retract with the step board for improved aerodynamics under predetermined conditions, wherein the at least two panels are operably connected to an inboard side of said links.

14. An active rocker aerodynamic shield integrated into an automated running board for a vehicle, comprising:
    an automated running board including a plurality of links for movement of a step board under predetermined conditions between a stowed position and at least one deployed position;
    at least two panels forming said aerodynamic shield, said at least two panels operably connected to the automated running board to automatically deploy and retract with the step board for improved aerodynamics under predetermined conditions, wherein the at least two panels are operably connected to an inboard edge of said links.

15. An active rocker aerodynamic shield integrated into an automated running board for a vehicle, comprising:
    an automated running board including a plurality of links for movement of a step board under predetermined conditions between a stowed position and at least one deployed position;
    at least two panels forming said aerodynamic shield, said at least two panels operably connected to the automated running board to automatically deploy and retract with the step board for improved aerodynamics under predetermined conditions, wherein the at least two panels are operably connected to an inboard edge of said links and extend past a forward edge of said step board.

* * * * *